United States Patent Office 3,412,737
Patented Nov. 26, 1968

3,412,737
SMOKE FILTER
Karoly G. Pinter, 26 Madison Ave., Morristown, N.J. 07960, and Edward J. Calhoun, 578 Hunt Lane, Manhasset, N.Y. 11030
No Drawing. Filed Jan. 17, 1966, Ser. No. 520,892
12 Claims. (Cl. 131—267)

ABSTRACT OF THE DISCLOSURE

In a tobacco smoking article, a filtering element, disposed so that objectionable constituents are removed from tobacco smoke passing therethrough, is provided comprising a matrix of a velvet-like sheet of glass microfibers. Such velvet-like sheet of glass microfibers is of the type generally employed in the chromatographic separation of organic materials.

---

This invention relates to a novel filter and filtering process for smoke and, more particularly, to the filtering of tobacco smoke employing a filter comprising a matrix of glass fibers.

It is generally acknowledged that filters in cigarettes, cigars, pipes, etc., must of necessity be formed from materials which are inexpensive, odorless, tasteless and have the property of being able to filter out the deleterious material present in the smoke without substantially altering the natural taste of the tobacco. In addition, the materials should be firm, and of such a nature as to have no annoying hindrance when the smoke is drawn therethrough.

The employment of filters for tobacco smoke is not a recent concept, that is, various traps for tars and other deleterious materials present in tobacco smoke have been employed in the past. In recent years, various natural and synthetic inorganic and organic materials have been employed as filters either alone, or in combination with each other, in an attempt to effect the removal of the undesirable components in tobacco smoke. Thus, for example, the following representative materials have been used with varying efficacy: treated and untreated materials from animal sources such as dried lungs, leather, wool, dessicated bone, etc.; plant materials such as cellulose, charcoal, cotton, paper, starch, dextrin and grain products, etc.; synthetic organic materials such as acrylates, pyrrolidones, etc., and inorganic materials such as silica gels, ion-exchange resins, and the like. Although such filtering materials, whether employed alone or in combination with each other, possess some desirable filtering properties, no completely satisfactory filter has been made available which is of relatively low cost so as to be economically attractive for use in cigarettes, cigars, etc., and simultaneously possess a high filtering capacity for purifying tobacco smoke. Moreover, all of the filter materials employed to date have fallen far short of providing ideal filtration because of their limited capacity to filter smoke when used in conventional sizes and weights. Furthermore, there has not been developed to date a filtering material which can provide for a predictable and predetermined amount of tar, etc., removal from tobacco smoke without affecting appreciably the flavor or the pressure gradient of the effluent smoke.

It has now been unexpectedly found, however, that an efficient, predictable filtering device can be prepared by the employment of a matrix of glass fibers. Such a filtering medium allows for a predictable and predetermined amount of tar, etc., removal without either appreciably affecting the natural flavor of the tobacco or the pressure gradient of the effluent smoke.

It is, therefore, a primary object of the present invention to prepare a tobacco filtering medium free of the inherent deficiencies of hitherto known materials.

It is yet a further object of the present invention to provide a tobacco filtering medium which will allow for a predictable and predetermined amount of tar removal from tobacco smoke without affecting appreciably the natural flavor of the tobacco or the pressure gradient of the effluent smoke.

It is still a further object of the present invention to provide an unexpectedly efficient smoke filtering medium comprising a matrix of glass fibers for filtering deleterious smoke from industrial and residential sources, e.g., car, bus, and truck exhaust systems and industrial and residential stacks and chimneys.

Still further objects and advantages of the filter medium of the present invention will become more apparent from the following more detailed description of the invention.

It has now been unexpectedly found that a filter can be produced which is able to provide for the removal of a predictable and predetermined amount of tar, etc. from tobacco smoke without affecting appreciably the natural flavor of the tobacco or the pressure gradient of the effluent smoke by employing as the filtering medium, a matrix of glass fibers.

The materials employed in the smoke filters of the present invention are glass micro-fibers developed and currently employed for chromatographic separation of organic materials. Such materials are soft and pliable and have a feel similar to velvet. The individual fibers of the matrix are commercially produced in diameters from about 0.005 millimeter to about 0.5 millimeter. These individual glass fibers are either rolled, woven, alminated or compressed into sheets, cylinders or any other desired shape for use as the filtering medium for tobacco smoke and the like.

The filtering elements are so disposed within the cigarette or cigar or pipe, or cigarette holders, etc., so that the tobacco smoke passes through the filtering element and the objectionable constituents are removed therefrom.

The following three parameters were found to affect the filtering capacity of the glass fiber matrices:
 (1) Thickness of the individual glass fibers.
 (2) Density of the glass fiber matrix, i.e., porosity of the matrix.
 (3) The length of filter used in the path of the effluent tobacco smoke.

By varying one or more of these parameters, it has been found in accordance with this invention, that tobacco smoke filtration on a predetermined controlled basis can be advantageously obtained. Moreover, a fitration approaching 100% i.e., 100% removal of deleterious tars, etc., without adverse effect on flavor or pressure gradient, can be obtained by a proper manipulation and variation of these parameters.

As stated previously, the thickness of the individual glass fibers usually varies from diameters of about 0.005 millimeter to about 0.5 millimeter although somewhat smaller or larger diameter materials can be effectively employed to meet varying requirements. This is especially true with respect to industrial uses where the diameters may far exceed these limits.

The density or porosity of the filtering matrix has also been found to have an effect on the ability of the filter to remove deleterious materials. In this respect, it has been found that the density of the filter affects in an inversely proportional manner, the pressure gradient, i.e., the draw of the effluent smoke.

It has been found that almost 100% filtration of the tobacco smoke can be obtained without increasing the length or the weight of the filter beyond that of the presently available commercial filters.

It is also within the scope of the present invention to coat or incorporate with the glass fibers of the filtering medium of the present invention, various substances to change or aid selective filtration and quantitative filtration of the tobacco smoke. Such altering materials include, for example, agents such as polyoxyethylene sorbitan monooleate, saturated salicylic acid solutions, vegetable oils, potassium silicate and the like known additions. Furthermore, in addition to these agents, it is within the scope of the present invention to include within the glass fiber matrices, if desired, various known flavoring agents such as aromatic oils, peppermint, licorice, anise, etc., so that a flavored taste will be present in the mouth of the smoker. In addition, various materials such as phenyl salicylate or p-acetylaminophenol, or their esters, can be used as coatings or incorporated into the filter matrix to reduce mouth odors from tobacco smoke.

As a theory for the ususual effectiveness of the filter medium of the present invention but not to be limited thereto, it is believed that such effectiveness is produced by a "magnetic" attraction between the glass fiber matrix and electro-statically charged particulate matter in the smoke. Friction is believed to be supplied to the particles through increased moeclular agitation and flow as a result of combustion. Such friction enhances the electrostatic charges of the particles with the resultant effect being an increased affinity between the filter and the particular matter in the tar, etc. of the smoke.

The novel filtering elements of this invention can be prepared in accordance with methods known in the art. It is thus within the teachings of this invention to not only employ the aforementioied materials alone, but also in combination with other materials and proven tobacco filtering materials. This is true whether the materials are to be employed as permanently attached filters in cigarettes wherein the glass fiber matrix is in fixed relationship to the tobacco charge as well as when the filter is to be incorporated in pipes, or in cigarette or cigar holders wherein the filters are disposable in nature.

In a preferred embodiment of the present invention, glass fiber discs are stamped out in thicknesses of approximately 1.0–1.5 mm., i.e., of sufficient porosity to allow the passage of smoke therethrough. From 1 to 6 of these discs can be employed as the sole filtering medium adjacent to the burnable tobacco charge of a cigarette by encasing them in a tube made of paper, metal, cork, or plastic, etc. Alternatively, a lesser number of such discs can be used in conjunction with conventional filtering media, e.g., cellulosic filters. For instance, glass fiber matrix discs can be placed either between the cellulosic filter and the burnable tobacco charge, or the cellulosic filter and mouth of the smoker, in order to produce satisfactory filtering elements. Additionally, glass filter discs can be inserted between commercial filtering elements.

In addition to the unusual tar removal properties of the glass fiber filters of the present invention, these filters are non-flammable. Therefore, burning cigarettes that are allowed to burn to the end of the tobacco charge go out upon reaching the filter since glass fiber cannot burn. Fire hazard is thereby lessened when compared with inflammable filters.

This property of non-inflammability also makes the glass fiber filters of the present invention extremely useful for other than tobacco combustion sources, e.g., car, bus or truck exhaust systems. In addition, the filter can be used in industrial and residential stacks or chimneys, all of these systems being responsible for air pollution, great health and property damage. While filter discs can be advantageously employed for these purposes, rolled or laminated cylinders of the glass fiber matrix are preferred.

Furthermore, the molecular nature of the glass fiber filters of the present invention precludes sogginess or water retention and thus filter efficiency is maintained throughout the smoking process. This is a definite advantage over conventional filters that become soggy or retain water or other fluid components of the smoke, or smoker's saliva, and thus loose filter efficiency as the smoking proceeds.

The following examples illustrate various embodiments of the present invention. It is to be understood that these examples are presented for purposes of illustration only, and are not to be deemed as limitative of the invention set forth in the specification and appended claims.

EXAMPLE I

Discs measuring 7 mm. in diameter and 1.2 mm. in thickness were punched out from a commercially available medium grade glass fiber chromatographic sheet. From 1 to 6 equal size discs were inserted into a glass tubing of almost the same diameter as used in commercial cigarette filters. This glass tubing with the disc inserts was interposed between standard size cigarettes and a commercial type smoking machine. Additionally, the tar was trapped in a chloroform-methanol (2:1) solution between the filters and the source of vacuum. The tar trapped from cigarettes without the filter of this invention was calculated by weighing the residual materials after evaporating the chloroform-methanol solution under nitrogen gas. The weights obtained from the unfiltered and the filter cigarette permitted the calculation of the filtration capacity of the interposed glass fiber filters. These results are expressed below in percent of tar trapped by the glass fiber filters, as compared to tar trapped when no filter was used:

| | percent tar trapped |
|---|---|
| No filter | 0 |
| Two filter discs | 36 |
| Four filter discs | 72 |
| Six filter discs | 97 |

Even with as many as 6 such filter discs, no appreciable loss of pressure gradient was observed. This indicates no appreciable loss in drawing power.

EXAMPLE II

Several commercial cellulose type filters were transversely bisected and a glass fiber disc 7 millimeters in diameter and 1.2 millimeters in thickness was placed between the proximal and the distal halves of the cellulose filters and resealed. The cigarettes were inserted into the smoking machine used in Example I and compared with the same brand of cigarettes without the glass fiber discs. The filtration coefficient, calculated as in Example I, indicated a 19% increase of tar trapping over the untreated cellulose filter. Moreover, when the filters were reopened there was a marked difference in the degree of discoloration of the cellulose filter when comparing the distal and proximal halves. Much less discoloration was observed in the half of the cellulose filter which was between the source of the vacuum and the glass fiber disc, the proximal half, which would be the equivalent of the contiguous half nearest the smoker's lips.

EXAMPLE III

In this example, a popular brand of commercial cigarette with recessed filter was utilized. In the recessed ¼ inch chamber glass fiber discs were inserted from 1 to 3 in number. The cigarettes were inserted into the smoking machine used in Example I and compared with the same brand of cigarettes without the glass fiber filter discs of the present invention. As a result of this test, a marked increase of trapped tars was found from the effluent smoke ranging from 21% with one disc to 67% with three discs.

EXAMPLE IV

The glass fiber sheets of Example I were coated with 5% ethanolic solution of Tween 80 [1] by dipping the sheets in that solution and subsequently air drying them. When discs prepared from such coated sheets were tested in the smoking machine as in Example I, and compared with ---
[1] Polyoxyethylene sorbitan monooleate.

the results obtained in Example I the tar trapping capacity of the thus-treated glass fiber was found to be increased by approximately 10% of the original capacity of glass fiber sheets without apparent loss in drawing power. A similar phenomenon was observed when either Tween 20 [2] or a 5% alcoholic solution of vegetable oil (corn or cottonseed) was used.

EXAMPLE V

In this example, a water solution of 6% potassium silicate was employed as a coating material. After drying the glass fiber sheets in a furnace of 210 C. degree temperature for 12 hours when the sheets were tested as in Example I, a reduction of filtering capacity of the tobacco smoke by 15% was observed with the coated fibers when compared with the non-coated ones. This phenomenon was thought to be due to a loss of the electrostatic potential of the fibers which aids in the filtration of the particulate matter in the tobacco smoke.

EXAMPLE VI

In this example, rolled cylinders of glass fiber sheets were employed as the glass fiber. Sheets of glass fiber 1½ x 4½ cm. by 1.2 millimeters thick, of fine quality grade were rolled into 1½ cm. long cylinders of concentric laminae. These cylinders were used in the same manner as the discs in the smoking machine as described in Example I. Although the efficiency of filtration was found to be slightly less than with discs of the same width, a slightly faster flow of the effluent smoke was observed.

EXAMPLE VII

This example involved the subjective criteria of 25 smokers who smoked cigarettes without and with the glass fiber filter [3] consecutively in that order. When asked about flavor loss in the smoke passing through the filter, 84% (21) claimed no loss of flavor; 12% (3)—some loss of flavor; 4% (1)—complete loss of flavor. Since glass fiber adds no taste of its own as a filter, these results show that little or no flavor loss from smoking cigarette with the filter of the present invention takes place.

We claim:

1. In a tobacco smoking article, a tobacco smoke filtering element comprising a smoke permeable matrix of a velvet-like sheet of glass microfibers so disposed in said article that substantially all of the tobacco smoke passes through said filtering element with some of the objectionable constituents being removed from said smoke.

2. In the tobacco smoking article of claim 1 wherein said matrix of a velvet-like sheet of glass microfibers additionally contains a deodorizing agent.

3. In the tobacco smoking article of claim 2 wherein said deodorizing agent is selected from the group consisting of phenyl salicylate, p-acetylaminophenol and esters thereof.

4. In the tobacco smoking article of claim 1 wherein said matrix of a velvet-like sheet of glass microfibers is in the form of disks, said tobacco smoke filtering element comprising from 1 to 6 of said disks.

5. In the tobacco smoking article of claim 4 wherein said disks individually are from about 1.0 to about 1.5 mm. in thickness.

6. In a tobacco smoking article, a tobacco smoke filtering element comprising a smoke permeable matrix of a velvet-like sheet of glass microfibers, said glass microfibers having a diameter of from about 0.005 to about 0.5 mm., said tobacco smoke filtering element being so disposed in said article that substantially all the tobacco smoke passes therethrough with some of the objectionable constituents being removed from said tobacco smoke.

7. In the tobacco smoking article of claim 6 wherein said matrix of a velvet-like sheet of glass microfibers additionally contains a filtration aid.

8. In the tobacco smoking article of claim 6 wherein said matrix of a velvet-like sheet of glass microfibers additionally contains a flavoring agent.

9. In the tobacco smoking article of claim 6 wherein said matrix of a velvet-like sheet of glass microfibers additionally contains a deodorizing agent.

10. In the tobacco smoking article of claim 9 wherein said deodorizing agent is selected from the group consisting of phenyl salicylate, p-acetylaminophenol and esters thereof.

11. In the tobacco smoking article of claim 6 wherein said matrix of a velvet-like sheet of glass microfibers is in the form of disks, said tobacco smoke filtering element comprising from 1 to 6 of said disks.

12. In the tobacco smoking article of claim 11 wherein said disks individually are from about 1.0 to about 1.5 mm. in thickness.

References Cited

UNITED STATES PATENTS

| | | | |
|---|---|---|---|
| 2,313,343 | 3/1943 | Jacob | 131—261 X |
| 2,569,575 | 10/1951 | Philips. | |
| 2,688,380 | 9/1954 | MacHenry. | |
| 2,966,157 | 12/1960 | Touey et al. | 131—269 |
| 3,019,854 | 2/1962 | O'Bryant. | |
| 3,039,908 | 6/1962 | Parmele. | |
| 3,177,650 | 4/1965 | Caruso. | |
| 3,197,955 | 8/1965 | Cohn et al. | |
| 2,327,991 | 8/1943 | Betts | 131—4 |
| 3,091,511 | 5/1963 | Calhoun | 21—55 |

FOREIGN PATENTS 757,841   9/1956   Great Britain.

SAMUEL KOREN, *Primary Examiner.*

D. J. DONOHUE, *Assistant Examiner.*

---

[2] Polyoxyethylene sorbitan monolaureate.
[3] The cigarettes containing the glass fiber filter of the present invention all contained 2 discs.